United States Patent [19]
Yan

[11] Patent Number: 5,601,702
[45] Date of Patent: Feb. 11, 1997

[54] REMOVAL OF ACIDIC HALIDES FROM GAS STREAMS

[75] Inventor: Tsoung Y. Yan, Wayne, Pa.

[73] Assignee: Mobil Oil Corporation, Fairfax, Va.

[21] Appl. No.: 367,498

[22] Filed: Dec. 30, 1994

[51] Int. Cl.[6] ............... C10G 19/073; C10G 25/00; B01D 24/00
[52] U.S. Cl. ............... 208/308; 208/390; 208/203; 208/262.1; 208/283; 208/286; 208/299; 208/302; 95/131; 95/132; 95/141; 95/142; 210/807; 210/902
[58] Field of Search .............. 95/131, 132, 141, 95/142; 208/308, 390, 203, 262.1, 283, 286, 299, 302; 210/807, 902; 201/29

[56] References Cited

U.S. PATENT DOCUMENTS

| | | | |
|---|---|---|---|
| 2,481,300 | 9/1949 | Engel | 196/36 |
| 3,074,779 | 1/1963 | Quin | 95/131 |
| 3,761,534 | 9/1973 | Sun et al. | 260/674 |
| 3,792,571 | 2/1974 | Waki et al. | 95/131 |
| 4,157,376 | 6/1979 | Vulikh et al. | 95/131 |
| 4,594,231 | 6/1986 | Nishino et al. | 95/131 |
| 5,030,610 | 7/1991 | Sakata et al. | 95/131 |
| 5,316,998 | 5/1994 | Lee et al. | 95/131 |

OTHER PUBLICATIONS

Oil & Gas Journal Item—Merichem Ad—Oct. 1994.
Copies of portions of "Opposers" work.
Lexpat Search—OGJ Sep. 17, 1990.

*Primary Examiner*—Glenn A. Caldarola
*Assistant Examiner*—Patricia L. Hailey
*Attorney, Agent, or Firm*—Malcolm D. Keen

[57] ABSTRACT

Acidic halides, especially chlorides, are removed from gas by contact with particles of solid caustic covered by aqueous and hydrocarbon phases, respectively. Effective neutralization is achieved without swelling or plugging the bed of solid caustic. Halides are removed as brine. Efficient caustic utilization is achieved by controlling water vapor levels in the gas based on pH of brine product.

13 Claims, 1 Drawing Sheet

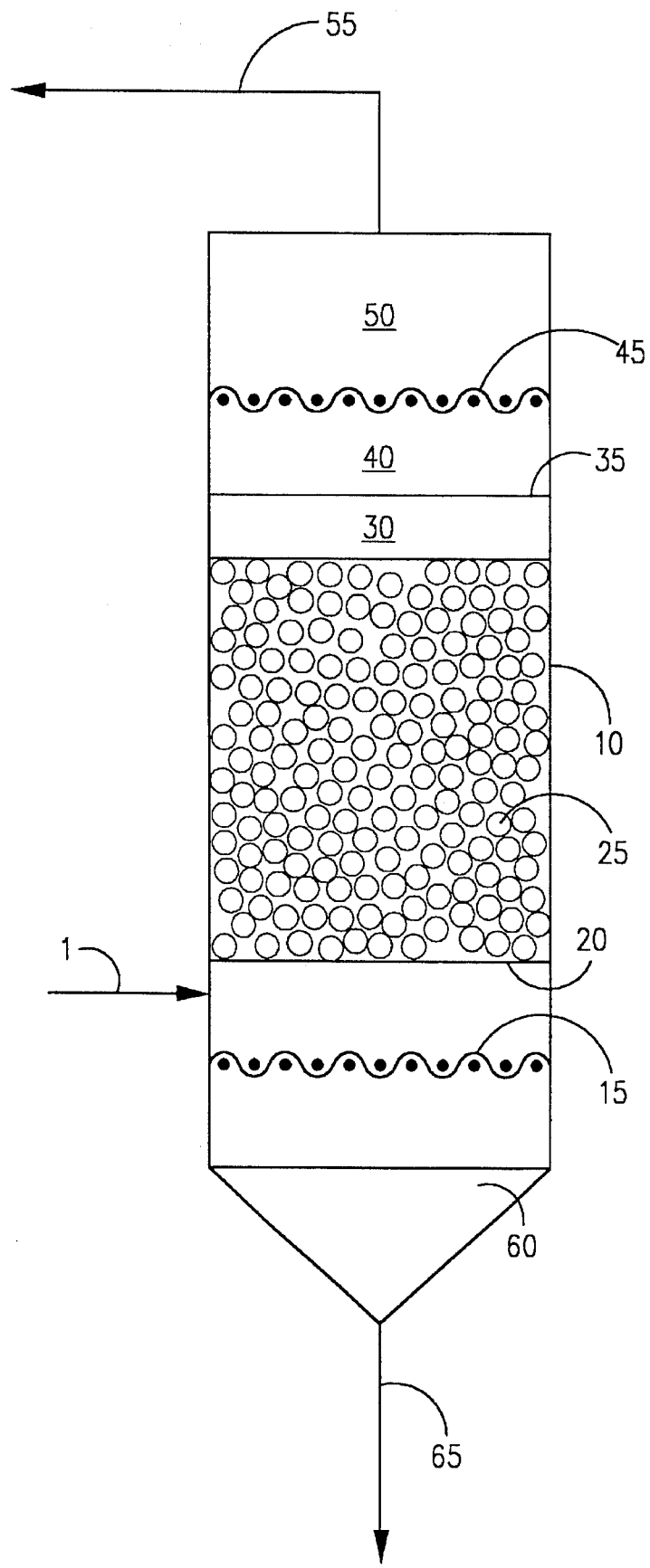

REMOVAL OF ACIDIC HALIDES FROM GAS STREAMS

CROSS-REFERENCE TO RELATED APPLICATIONS

This application is related to my prior co-pending application Ser. No. 08/217821 filed on Mar. 25, 1994.

This application is also related to other applications of mine filed simultaneously with this application directed to:

| DOCKET | TITLE |
|---|---|
| 7579 | TWO PHASE TREATMENT OF VAPOR TO REMOVE HALIDES |
| 7581 | TWO PHASE REMOVAL OF HALIDES FROM LIQUID HYDROCARBONS |
| 7582 | THREE PHASE REMOVAL OF HALIDES FROM LIQUID HYDROCARBONS |
| 7583 | REMOVAL OF ACIDIC HALIDES FROM HOT GAS STREAMS AND ATTRITION REGENERATION OF CAUSTIC |
| 7584 | WASHING SALT FROM SOLID CAUSTIC WITH OIL |
| 7585 | NEUTRALIZING VAPOR/LIQUID SEPARATOR |

FIELD OF THE INVENTION

This invention relates to removal of halides, especially chlorides, from gas streams, especially reformer recycle and off gas.

BACKGROUND OF THE INVENTION

Catalytic reforming, using Pt based reforming catalyst, is one of the most important refinery processes in the world. Most refineries have a catalytic reformer, which converts naphtha fractions into high octane reformate.

Reformers come in many types and sizes—from 2000 BPD fixed bed units to moving or swing bed units processing more than 50,000 BPD. Reformers are available with fixed bed reactors, swing bed reactors, or moving bed reactors. Many new units are moving bed reactors, available from UOP, Inc, Des Plaines, Ill.

Reformers generally use mono-metallic catalysts (Pt on a support such as alumina) or bi-metallic catalyst (Pt-Re on a support). Other combinations of Pt and other metals are known.

All reforming catalysts are believed to contain halogen, almost invariably chlorine. Chlorine is now ubiquitous in catalytic reforming. Chloroplatinic acid may be used in the impregnation solution forming the catalyst. Some refiners may add chlorine compounds during normal operation.

One major oil company developed a Pt reforming catalyst regeneration or "rejuvenation" procedure which conducted at least some portions of the regeneration in the presence of one or more chlorine compounds. The procedure was believed originally developed for swing reactor systems which were regenerated every day or so, but this regeneration method, or some variant of it, was eventually used in semi-regenerative reformers and in moving bed reformers.

All of this chlorine can, and does, find its way into gas and liquid products from the reformer. Based on a review of several decades of The Oil and Gas Journal, the key to successful catalytic reforming is lots of chloride. For decades refiners have talked about the problems of getting enough chlorides into the system, and dealing with the chlorides in the vapor and liquid products from the reformer.

In 1977 there was talk of the need for heat, chloride and moisture to redistribute platinum.

In 1980 there was a discussion of deposits of ammonium chloride in catalytic reforming compressor internals.

In 1985 there was discussion of the need for, and difficulty of maintaining, 1.0 wt % chloride on bimetallic catalyst between regenerations. It was suggested to "come out on the high side on chloride."

In *Alumina adsorbents effectively remove HCl from reformer H2 gas stream*, Janke et al, Oil and Gas Journal, May 12, 1986, page 64, talked about controlled injection of organic chloride at the reformer reactor inlet, and the mischief caused by all this chloride. The problem was worse with continuous catalytic reforming processes, which were reported "to require higher levels of chloride addition for regeneration . . ." The solution proposed by the authors was use of alumina adsorbents to remove the HCl from the net off gas. This article is incorporated by reference.

In Apr. 1, 1994 there was a discussion of the problem of corrosion in fired heaters due to chloride in the hydrogen from the reforming unit. The proposed solution was to install alumina treaters.

The problem is not limited to reformers. Similar problems occur in some isomerization units, and may occur in other units which are relatively dry and use a chloride containing catalyst.

The conditions which lead to chloride problems are catalysts which contain, or reaction conditions which require, chlorine compounds, and reactants which are dry enough that no separate aqueous phase forms in the vapor/liquid separator downstream of the reactor. Essentially all Pt reformers meet these conditions, and many isomerization and other processing units meet these conditions.

The situation could be summarized as follows for Pt reformers. Although refiners may use different reforming catalysts, all the catalysts seem to contain chlorine. There is enough chlorine either present in the virgin catalyst, or from chlorine addition during reformer operation, or from chlorine added during the catalyst regeneration, so that chlorine compounds appear in all the product streams coming from the reformer. Both vapor and liquid products have chlorine compounds.

The raw liquid reformate has chlorides. The net hydrogen gas make has chlorine compounds. When the raw reformate is fractionated, usually in a debutanizer, the overhead fractions contain chlorine compounds.

While chlorides in liquid reformate are a serious problem, the present invention is not directed to solving that problem. Instead, the present invention focuses on removal of chlorides or other acidic halides present in gas streams from the reformer. Of primary concern is removal of chlorides from the net gas make from the vapor liquid separator. Another concern is removal of chlorides from vapor streams generated by downstream processing of raw reformate, e.g., removing chlorides from overhead separator vapor associated with reformate fractionators.

Thus the process of the present invention focusses on removal of chlorides from gas streams, rather than from liquid streams.

It should also be clarified that while most reformers use chlorines as a catalyst component, some may use other halogens, such as F or I, but Cl is the halogen of choice, so hereafter chlorine and its reaction or degradation products will be referred to rather than halogens in general.

To solve the problem of removing chlorides from gas streams, refiners have generally used beds of solid adsorbents, such as alumina impregnated with an alkaline material such as NaOH. Such approaches are discussed in the 1994 and 1986 OGJ articles discussed above. While these approaches work, there are problems associated such alumina beds. The problems can include one or more of: cost, catalytic activity, regeneration and disposal.

Alumina beds are relatively costly, in terms of the amount of active ingredient present. The alumina material typically contains 5 to 10 wt % caustic. Alumina costs much more than caustic, and the alumina primarily serves as a support, but one which unfortunately is not always inert.

Alumina beds can exhibit catalytic activity. When alumina beds are used to remove chlorides from flowing vapor streams, aluminum chloride can form, and cause catalytic reactions which convert some of the hydrocarbon vapor species into a much higher molecular weight material. In some units, the gas is turned to goo, at least enough is formed that the effectiveness of the alumina bed is much impaired. This heavy viscous material must be removed to "regenerate" the alumina bed, so that it may be used to absorb additional amounts of chlorides or other acidic components from the flowing gas stream. Steam stripping will usually "regenerate" such a bed.

Disposal of solid adsorbents can be a serious waste management problem. Solid bed adsorbents must eventually be retired and the bed frequently contains too much hydrocarbon to permit the material to be dumped into a landfill. The adsorbent bed may be steam stripped as a prelude to disposal. The resulting water/hydrocarbon product must be stripped to remove benzene from the waste water.

I studied the problem of chloride removal from reformer vapor streams and realized that much of the problem could be overcome by a different approach, which ignored much of the conventional wisdom in gas treating.

While I still made use of a simple acid/base neutralization reaction, my approach used concentrated solid caustic, rather than caustic on some form of support. Rather than use finely divided solid caustic—which one would intuitively think would be better for vapor/solid contact—I used a low surface area material, preferably of large size and with little porosity.

I found a way to permit the process to run almost continuously when treating relatively cool, dry gases such as reformer recycle gas, by coating the bed with liquid hydrocarbon. This should have been a barrier or impediment to the neutralization reaction, but instead allowed the bed to operate for extended periods without plugging, while continuously producing a brine product. Salt was produced continuously, and continuously removed as brine.

This new approach to gas treating allowed significant modifications to some refinery processes. In treating reformer recycle gas I was able to remove a significant amount of the chloride present in the recycle gas. Much of the chloride that the reformer feed, or the reformate, "sees" is simply the chloride present in the recycle gas.

The recycle gas outnumbers the feed, on a molar basis. Removing much of the fugitive chloride from the recycle gas could reduce the chloride loading of the reformate. There would still be some chloride in reformate, due to extraction of chlorides from the reforming catalyst, but the problem would be reduced. This could be used to reduce the amount of chloride in the liquid reformate stream, as well as reduce chlorides in the net gas make of the reformer.

The process could also be used to treat only the net gas make, or excess recycle gas make which is removed as one of the vapor phase products of the platinum reformer. While this stream usually is not considered corrosive (it typically has less than 10 ppm water and only a few ppm chlorides) the catalytic uses to which this hydrogen rich stream is sometimes put can make the chloride content a significant problem.

The debutanizer overhead gas make from a reformer may also be treated. Although a relatively small vapor stream, it typically has a much higher chloride content than any other gas stream associated with the reformer, and usually must be treated for chloride removal before use as fuel or in other refinery processes.

Now acidic gas streams can be treated without formation of viscous oils, as occurred with some adsorbents. Adsorbent swelling and bed plugging are eliminated. High capacity and reactivity of my new bed permit use of smaller reactors and longer cycle lengths.

All of these things are made possible by using a bed of solid caustic or other concentrated alkaline material wetted with or immersed in liquid hydrocarbons to remove acidic halides from gas streams.

This simple change, wetting a solid bed with liquid hydrocarbon, should have made the process worse. It would, at a minimum, add an insoluble hydrocarbon layer which might be thought to isolate the solid caustic from the gas stream.

In practice, the process can be even more complex and may involve the following:

a. a solid caustic material b. an aqueous film on the caustic c. a hydrocarbon phase covering the aqueous film d. a gas phase sweeping by the aqueous phase.

A process involving a solid phase, two immiscible liquid phases, and a gas phase would not normally be considered for an efficient remover of acidic components from a flowing vapor stream, but my experiments show that it works well.

It is almost like some biological processes. It is both complex and efficient. There are four phases involved, one solid, two immiscible liquid phases, and a gas phase.

As the process works simultaneously using four phases, it might properly be termed a quadriphase extraction process, and such terminology is used extensively in this specification as an efficient but brief way to describe this complex process.

An additional feature of the quadriphase system is that it can remove acidic compounds from a gas stream using, indirectly, an aqueous absorbent, without adding much water to the flowing gas stream. At least much less water is added to the gas than would be the case if an aqueous solution of liquid caustic were used to treat the gas.

The process is unusual in that it permits use of pure caustic as a reagent, but the bed does not plug or fuse even though significant amounts of solid caustic are eventually consumed.

The quadriphase process can run for weeks and months even when processing cool gas containing significant amounts of moisture and chlorides. This process can process for extended periods a gas which rapidly plug a solid bed of caustic run without oil. The quadriphase extraction process ran on such gases for months, while a more conventional bed of solid caustic (not oil coated) fused and effectively plugged after a short period of operation in both up and down gas flow. There was no way I could use solid caustic by itself and have a process which would work for a long time to treat such gasses with significant amounts of chlorides and moisture.

The solid caustic could, if coated in oil, be used in a mechanically simply but chemically complex process, involving multiple immiscible liquids to treat gas streams efficiently to remove acidic halides and even to continuously regenerate the solid bed by continuously removing salts as brine.

The above discussion focused primarily on cool gas streams, such as those gas streams from Pt reformers. Using quadriphase extraction, these gas streams could be successfully treated for extended periods using beds of solid caustics. Such beds would plug within hours or days if attempts were made to simply use such a bed without the hydrocarbon layer on the aqueous layer.

Having established an effective way to remove chlorides from gas using the above multi-phase system, I modified this technology to be able to treat dry gas which did not have enough native water, or enough water of neutralization, to maintain a suitable brine phase. Hydrating the dry gas, or spiking the bed with water, allowed even these dry gas streams to be treated using the quadriphase approach. Monitoring of the pH of the brine produced during quadriphase treating also gave a powerful, reliable, and inexpensive way to optimize caustic consumption, and minimize the amount and alkalinity of the brine by-product.

BRIEF SUMMARY OF THE INVENTION

Accordingly, the present invention provides a process for a process for removing acidic halides from a gas phase comprising disposing solid particles of caustic as a porous bed, dissolving at least some of said solid caustic in an aqueous layer covering said solid particles, coating or immersing said aqueous layer with an immiscible hydrocarbon liquid phase; and reactively extracting acidic halides from said gas phase by passing said gas through said porous bed.

In another embodiment, the present invention provides a process for removing acidic halides from a halide containing gas comprising, disposing particles of solid caustic as a porous bed, immersing said bed in a hydrocarbon liquid phase forming an aqueous film on said solid caustic beneath said hydrocarbon liquid phase by passing a water containing gas through said bed, and reactively extracting acidic halides from said halide containing gas by passage through said porous bed.

BRIEF DESCRIPTION OF THE DRAWINGS

The FIGURE is a simplified schematic view of a preferred solid caustic reactor.

DETAILED DESCRIPTION OF PREFERRED EMBODIMENTS

The invention can be better understood in conjunction with a review of the FIGURE which is optimized for continuous treatment of relatively cool but dry gas streams, such as reformer recycle gas or the reformer debutanizer overhead receiver vapor. A solid caustic bed is used in conjunction with two liquid phases, a skin or film of brine on the particles of solid caustic, and a continuous liquid hydrocarbon phase soaking or enveloping the caustic bed. Because of the four immiscible phases involved, solid, aqueous liquid, hydrocarbon liquid, and vapor containing acidic halides, it is sometimes referred to as a quadriphase treating process.

Basically reactor 10 holds a large fixed bed 25 containing solid caustic and some means for, at least intermittently, adding and/or removing various phases.

The solid caustic can be mixed with, or held by, solid supports such as activated carbon, woods, fibers, etc. Solid caustic flakes, pellets or the like may be used and simply be held by screens or trays not shown. In the quadriphase process, even finely ground or flaked caustic may be used with little danger of plugging. The process also works well with much larger beads of solid caustic, so for ease of handling and to make it easier to design the caustic bed it usually will be preferred to use large beads of solid caustic or other solid alkaline material.

Gas from line 1 is added to a lower portion of the device and passes through support means or screen 20 into the lower portion of a solid caustic bed 25. The bed is preferably primarily solid caustic. Gas bubbles pass through bed 25, which removes acidic components, usually chlorides, from the gas. The gas leaves the top of bed 25 and passes through the remainder of the hydrocarbon continuous phase 30 which covers bed 25. Some liquid is usually entrained with the gas, and some phase separation occurs in settling region 40, with additional separation achieved in passing through demister pad 45. A gas phase with a reduced acidic halide content passes through an additional disengaging region 50 and finally leaves reactor 10 via line 55 for further process not shown.

The bed 25 is immersed in a continuous hydrocarbon phase. The aqueous phase, a watery film on the solid caustic will form eventually, in situ, due to production of water during chemical neutralization and/or the presence of some water in the entering gas. The water film enhances removal of acidic halides from the flowing vapor. There will be a net production of water due to the formation of water during the neutralization reaction. The net water production is generally removed as a brine phase. Produced brine, along with any entrained water in the entering gas, drips or is discharged through screen or support 20 down through optional coalescing pad 15, which helps separate aqueous and oil phases. Brine drops down to collect in pool 60 in the base of reactor 10, and is removed continuously or periodically via line 65.

In the embodiment shown, which is based on actual laboratory experiments, the brine phase withdrawn from the reactor is almost neutral, meaning that a significant amount of reaction with acid components in the incoming gas likely occurs at the base of bed 25 or in the region separating base 25 from brine pool 60 with little loss of caustic due to dissolution in the brine. This represents a most efficient chemical use of the solid caustic, reduces the size of the waste stream, and reduces or eliminates the cost of neutralizing this waste stream.

More details will now be provided about each part of the process.

GAS STREAM WITH ACIDIC COMPONENTS

The process can be used with any gas stream containing acidic halide compounds which can react with solid caustic.

The gas stream can be mostly hydrocarbon vapors and hydrogen, or inert, or an oxidizing atmosphere such as air or flue gas with minor amounts of air.

Details on some of the types of acidic halides present in refinery streams, and the salts they form, are disclosed in *Calculations estimate process stream depositions*, Oil & Gas Journal, Jan. 3, 1994 pp 38–41, Yiing-Mei Wu. This article is incorporated by reference. It is cited to provide details on some of the many chemical species which exist in refinery and petrochemical streams.

Among the most ubiquitous halides are the chlorides, which are discussed extensively in the OGJ article above, and which cause so much mischief in refineries, and especially around and downstream of reformers. The discussion that follows will therefore focus on chlorides and reformer streams.

The process is especially useful for treating reformer recycle gas, reformer off gas, and gas streams associated with reformer fractionators such as the off gas from the reformer debutanizer overhead receiver.

The gas stream can be dry or wet, i.e., contain some dissolved and/or entrained water or have a significant water vapor pressure.

The gas stream may, and frequently will, have significant amounts of entrained liquid hydrocarbon. The process tolerates large amounts of liquid hydrocarbons.

While my quadriphase treating process can be used briefly as a completely dry process, some guidelines regards an optimum approach can be given, based on the moisture content and conditions of the flowing gas stream.

First, the process is not sensitive to vapor phase hydrocarbons, nor liquid hydrocarbons. The quadriphase process tolerates large amounts of liquid hydrocarbons.

In general, if high chloride removal, and maximum use of the solid caustic used to treat the gas stream, are most important then it is best to use quadriphase extraction. This calls for a more complicated reactor design, but permits great latitude in the physical form of the solid caustic.

If lower chloride removals can be tolerated, or if a simple relatively foolproof reactor design is of great importance, then a dry bed process may be used, as disclosed in my co-pending application.

If the flowing gas stream has a low moisture content then some provision must be made for at least periodic injection of water into the stream or the bed of solid caustic so that quadriphase treating may be practiced.

If the flowing gas stream is very hot, and it would not be practical to cool it to a temperature where a liquid phase could exist then a dry bed process must be used.

One important factor in all gas treating is relatively humidity of the gas at treating conditions. If the gas to be treated contains less than 10% of the water that it could hold, it has a relative humidity of less than 10%, and it may be considered dry and a dry process may be used.

Preferably the relative humidity is lower than 10%, preferably lower than 5%, and most preferably 1% or less. In absolute terms, the moisture content of the gas should be below 3000 volume ppm water, and preferably is less than 1500, and most preferably is below 300 ppm. The process works well when the gas stream contains less than 100 volume ppm water.

If the gas stream has a relative humidity greater than 10%, and certainly if the gas is nearly saturated with water, then a water phase will form on the solid caustic, and the treating process might as well be designed from the start to accommodate a water phase.

In practice, most of the gas streams treated by my process will not be anywhere near saturation with water. Reformer net recycle gas make, and reformer debutanizer overhead receiver vapor are dry streams which can be treated well using the quadriphase extraction process reviewed below or treated with some reduction in efficiency using a completely dry bed.

TYPE OF SOLID CAUSTIC

Quadriphase treating can make most any form or type of alkaline solid work. Either beads, pellets, pills, flakes, or solid caustics used neat or mixed with various supports or fillers.

Use of pure NaOH—technical grade rather than reagent grade—is preferred for low cost, but other materials such as glassmakers alkali (a mixture of about 20% $Ca(OH)_2$+80% NaOH), or KOH, soda lime, and like materials may also be used, though not necessarily with equivalent results.

At least a majority, and preferably at least 80%, and more preferably at least 90% of the alkaline solid is NaOH or KOH.

SODIUM HYDROXIDE

Because sodium hydroxide is the preferred reagent for use herein, some more information about it is provided below, taken primarily from Kirk-Othmer, Alkali and Chlorine Products.

Pure, anhydrous sodium hydroxide (NaOH or caustic soda) is a white, slightly translucent crystalline solid. Although made in the form of a solid, flakes or beads, it is almost never used in the solid form. As stated therein ". . . it is used almost exclusively in water solutions . . ."

Caustic has a melting point of 318° C., and a density of 2.13 g/cc. It is highly corrosive to skin, in aqueous solutions even in moderate concentrations. Caustic is used in most refineries in this most dangerous form, as a liquid. Although it can be handled with safety if proper precautions are taken, it is much easier and safer to work with dry solid caustic (I prefer beads) than an aqueous solution of caustic.

The solid caustic can be finely ground, or crushed, or used in the form of a high surface area material such as berl saddles, multi-lobed pellets, or the like. Quadriphase extraction permits a great variety of sizes and shapes of solid caustics to be used without fear of bed plugging.

While quadriphase extraction permits most any form or type of solid caustic to be used, it works very well with readily available large beads or pellets of solid caustic. Preferably the solid caustic does not have any significant amount of porosity, internal surface or internal structure. The quadriphase extraction of chlorides is believed to occur at the liquid/liquid interface, just above the outer surface of the beads of solid caustic.

REACTOR BED DESIGN

The caustic may be disposed as a single fixed bed, moving bed, multiple fixed beds, an expanded bed, an ebullated bed or as a fluidized bed. For simplicity, most refiners will prefer to use a simple fixed bed.

For quadriphase extraction of gas streams at high gas hourly space velocities, or when the geometry of the bed is such that the superficial vapor velocity of gas through the bed is very high, it is possible for the bed to lose its liquid hydrocarbon phase. This occurred in one laboratory reactor, operating with a large gas rate. If this occurs, either due to high gas velocity or to loss from evaporation then it is important to rewet the bed with liquid hydrocarbon. This can be done continuously or intermittently by pumping into or through the bed the necessary amount of liquid hydrocarbon.

REACTIVE QUADRIPHASE EXTRACTION

This process is very simple. Gas passes over solid caustic which is, or has been, immersed in a hydrocarbon. No liquid need be added once the quadriphase system has been established, nor any other chemicals except for the initial load of solid caustic. Some humidification of the gas might be beneficial at startup so that a brine phase forms rapidly, but this will usually form by itself over time.

The transport phenomena involved are complex—involving transport from a gas phase to and through a hydrocarbon coating on an aqueous film, to and through an immiscible phase (an aqueous film) to the solid caustic.

Although it is not known for certain what transport phenomenon are at play here, it is believed that acidic halide components pass through the gas and hydrocarbon phases to reach the aqueous phase. Solid caustic dissolves to reach the aqueous phase, where the neutralization reaction is believed to occur. The neutralization reaction, discussed in more detail below, is straightforward.

The chemistry of my process is simple. Simple neutralization reactions are involved which proceed rapidly and completely which makes the process effective. The primary reactions involved are:

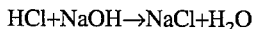
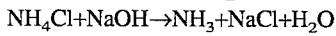

The reaction products remain in the water of reaction which forms a skin or film upon the solid caustic particles. The water dissolves the NaCl formed to produce brine which settles at the bottom of the reactor. A clean gas exits the reactor and is charged to a gas plant, recycled to a reformer or may be burned as fuel.

The solid caustic may be in the form of pure particles of a suitable caustic material, such as NaOH, KOH, CaO, MgO and the like. NaOH and KOH are preferred, and use of NaOH is generally the most preferred. If, e.g., the halides of primary concern are fluorides, then use of KOH is preferred.

This material may be extruded, pilled, prilled, or formed using conventional techniques into any desired shape, preferably one with a high surface area to volume ratio which is mechanically strong and allows free flow of liquids.

To improve material handling it may be beneficial to add conventional solid supports to or around the solid caustic. Thus the caustic solids can be mixed with activated carbon, porous resins, woods, fibers and the like. When a support is used it preferably comprises a minority of the reactive solid, so that a majority, by weight, of the reactive solid used in the bed is caustic.

Alternatively the solid caustic may be in baskets or fiber bags, perforated tubes, trays or the like.

QUADRIPHASE EXTRACTION CONDITIONS

Like most inorganic reactions, the reaction of halide species, usually chlorides, with alkaline materials proceeds rapidly and completely. The slow step or steps are likely to be in transport of acidic components into the hydrocarbon phase and through the hydrocarbon phase to the aqueous phase. Although conceptually this seems such a convoluted and complex reaction path that it could never work in practice, it proceeds well at conditions readily achieved in refinery process units.

In functional terms, contact should be long enough to remove at least a majority, and preferably more than 90%, and most preferably more than 95% of the chlorides in the gas. Short contact times reduce the size of the equipment.

The major corrosion components in reformer off gas and recycle gas are typically HCl, NH$_4$Cl and FeCl$_3$. The gas containing these corrosive components is heated to 70° to 180° F, and introduced from the bottom of the reactor. The feed bubbles up through the bed of solid caustic.

Entrainment of caustic or brine in gas is undesirable and usually not a problem because no emulsion of caustic/reformate or brine/reformate need ever form. An aqueous phase forms but tends to remain as a tightly held film on the solid caustic until a sufficient amount accumulates that a drop forms which can fall down. The aqueous phase is tightly held as a film, and eventually forms relatively large drops which readily fall out of solution.

In terms of space velocity, the GHSV may range from 100 to 100,000 and preferably from 1000 to 10,000 GHSV.

Temperatures and pressures used are not narrowly critical. In general, the process works well at conditions above freezing and low enough to maintain the hydrocarbon solvent and the aqueous phase as liquids at the pressure at which the plant operates. Thus pressures should be high enough to maintain liquid phase and temperatures may range from 5° to 200° C. or with temperatures of 10°–100° C. giving good results.

Caustic is used stoichiometrically, not catalytically. Caustic is continuously consumed in my process and the solid bed will eventually need to be replenished. Although the process does not use a "catalyst" per se, and consumes itself for treating, the process operates a long time because the caustic is present in a massive amount as a high concentration solid rather than a dilute liquid or a diluted form of solid adsorbent, such as alumina impregnated with caustic.

My solid caustic bed will continue to reactively remove chlorides until caustic exhaustion causes a breakthrough in Cl levels. At this point the process may be shut down briefly so that additional solid caustic can be added. Alternatives for continuous operation include a swing reactor system or continuous addition systems, such as a lock hopper above the solid caustic bed. These can be used to add solid caustic without stopping the flow of gas.

Reactor Design

The quadriphase extraction process will operate with many types of reactor designs, including fixed bed (both upflow and downflow), moving bed, expanded bed or ebullatting bed, and various kinds of fluidized beds. For most units a simple fixed bed design will be sufficient, with upflow operation preferred.

When a simple fixed bed reactor is used, with the solid caustic simply dumped onto dumped structured packing, the following guidelines can be given. The reactor preferably contains structured packing (~1–20% of reactor volume) in a lower portion of the reactor and then solid caustic (80–95% of reactor volume). About 0–20% of the reactor at the top can be empty or filled with a demister pad. The reactor is very simple, and need only have an inlet on one side of the bed for incoming gas and an outlet on the other side of the bed for treated gas. The only "moving" part is a low spot with an outlet for periodic bleeding of chemically produced brine.

Either upflow, downflow or cross-flow operation is possible and each has some unique benefits.

Downflow operation permits chloride removal with minimal hydration of gas. The force of gravity augments the shear forces of the flowing gas to promote removal of formed brine from the solid caustic. For downflow operation it will be necessary to have some sort of pumparound circuit to at least periodically "slug" or wash the bed with liquid hydrocarbon. Alternatively a small amount of a suitable oil could be added continuously, or the bed might be periodically removed from service and the bed of solid caustic immersed briefly in oil.

Upflow, as shown in the Figure, will generally allow a thicker skin of brine on each particle of solid caustic, but the fluid dynamics involved are complex. Preferably the bed operation is monitored, or the bed is designed based on experiments or calculations, so that the brine phase, or aqueous caustic phase, is not the continuous phase. If this happens the particles of solid caustic could lose their coating of oil, and start to behave like conventional packed beds of solid caustic, with plugging problems rapidly developing. Should this happen, the gas flow rate may be increased to expand or ebullate the bed, which may unclump the bed. To avoid this it may be beneficial to simply immerse the entire caustic bed in liquid hydrocarbon, which is the procedure used in many of my experiments.

Cross-flow, especially if practiced in a radial flow reactor, greatly increases the cross sectional surface of the solid bed of caustic presented to reformate liquid. Ideally an in-to-out configuration is used in a radial flow reactor so that as the vapor approaches the terminal portions of the bed of solid caustic the superficial vapor velocity drops to a minimum. If any brine is entrained at the bed inlet it can be recollected before it leaves the bed. Use of a radial flow reactor with an imperforate upper portion, which acts as a reservoir of solid caustic, will allow an extended run length despite caustic consumption.

Most refiners will prefer to use a simple fixed bed system. The process provides satisfactory run lengths, despite using a bed which is consumed during the halide removal process.

Long runs are achieved because the bed contains solid caustic, rather than a dilute solution of caustic, and the flowing vapor fed to the reactor usually contains less than about 1 wt ppm Cl.

DRY BED REACTION CONDITIONS

When the process is run with a completely dry bed (no liquid oil phase, no aqueous phase), very great latitude is possible in bed conditions.

The dry bed process does not seem to be as effective at removing chlorides as quadriphase extraction. As an example, to achieve the same amount of chloride removal roughly 2 to 10 times as much solid caustic must be used for a dry bed process as for quadriphase extraction.

In many applications it will be satisfactory to remove only a majority, or 80% or 90% of the chlorides in a gas stream, and for these applications dry bed treating will be very satisfactory.

It is also beneficial to use a relatively large dry caustic bed, in that the larger bed size permits much greater loading of the caustic with salt. The salt concentration will continue to build on the inlet side of the dry bed, and can exceed 5 wt % salt, and even approach 10 wt % salt while achieving satisfactory chloride removal, as the downstream portions of the caustic bed will still remove chlorides.

Many refiners will like the simplicity and long life of a relatively large bed of solid caustic as compared to a more efficient, but more complex, quadriphase reactor bed.

When a dry bed reactor is used, salt formation will eventually increase to the point where bed replacement (with fresh solid caustic) or bed regeneration is needed. Bed regeneration is not essential for the practice of the present invention, refineries have many uses for solid caustic and for many of these uses the presence of 5 or 10 wt % salt will not be troublesome.

Although bed regeneration is not essential, I developed two regeneration procedures which can be used to remove the salt deposits from dry bed. These procedures are reviewed briefly below.

BED REGENERATION—HYDROCARBON WASHING

Liquid hydrocarbon, saturated with water, can be used to selectively remove the salt deposits from the bed of solid caustic without dissolving significant amounts of caustic. The key to this approach is use of a hydrocarbon continuous phase which is saturated with water. Thus a water saturated petroleum naphtha fraction could be pumped through a bed of solid caustic, then extracted with water. The water would both remove salt from the liquid hydrocarbon and resaturate the naphtha with fresh water. Depending on salt concentration, and the amount of water in the liquid hydrocarbon, it will usually be possible to remove 80 to 90% of the salt deposits by 3–6 washings of the bed with liquid hydrocarbon.

The pH of the wash water used to extract salt from liquid hydrocarbon removed from the bed may be monitored as a sign of relative salt v. caustic removal. I prefer to stop the regeneration when the pH is about 8.5 and no more than 9.0.

BED REGENERATION—SALT ATTRITION

An interesting feature of dry bed gas treatment process is that it forms soft, flakey salt deposits on large, non-porous solid caustic particles. Because the salt is essentially all on the surface of the caustic particles, the caustic may be "regenerated" by physically removing the salt deposits. This can be done by removing the caustic pellets and removing salt deposits by physical brushing or mild sandblasting.

An even more efficient salt removal technique is to fluidize the caustic particles and let particle to particle contact attrit soft salt deposits from solid caustic. Bed fluidization could be achieved with either vapor or liquid, though preferably a hydrocarbon liquid is used rather than water, as water would dissolve too much solid caustic.

EXAMPLES

The tests were designed to investigate removal of chlorides from gas streams. The gas stream was a bone dry, reagent grade nitrogen stream which was first passed through a reservoir filled with reformate or pretreated naphtha, to simulate a reformer recycle gas which would be in equilibrium with a large amount of liquid reformate, then passed through a flask containing concentrated hydrochloric acid. The gas picked up chlorides and moisture as it flowed through the acid flask. The chloride concentration in the gas could be varied by varying the amount and concentration of acid in the flask. A naphtha layer over the acid layer was used to control the amount of water added to the nitrogen. A typical gas composition, using standard test methods, was 114 wt ppm HCl and 1.8 wt ppm H2O.

In quadriphase testing several different hydrocarbon solvents were used, as shown in the following table. Upflow was used. The hydrocarbon solvents all worked well, although low aromatic solvents had less foaming tendency than higher aromatic solvents.

In dry bed testing the only time hydrocarbon solvent was present was during bed regeneration.

Each testing program will be reviewed in turn, starting with quadriphase treating.

QUADRIPHASE TESTING

Reactor

The reactor was a ½" stainless steel tube fitted with a check valve and TEE. The reactor was packed with 5 cc of NaOH beads of about 0.5 cm diameter. Exposures of the NaOH to air was minimized by filling the reactor with the solvent, a reformate discussed hereafter, and transferring the NaOH as fast as possible. The $N_2$ gas as a controlled rate was passed through the system similar to that shown in the Figure. The effluent gas was scrubbed with NaOH solution to determine its HCl content. In the discussion that follows, the terms chloride removal and HCl removal are used interchangeably, because the gas only contained HCl.

The reactor temperature was controlled by use of a heat tape. The general operating conditions were:

pressure 50 psig $N_2$ flow rate 200 cc/min

NaOH bed 5 cc

Reformate 17 cc

To make the chloride material balance, the content of the reactor was drained every day, and extracted with 100 cc of water to determine the amount of chloride extracted in the process. This chloride is called residual chloride on Table 1 and 2. The chloride balance is defined as follows:

$$\text{Chloride balance, \%} = \frac{\text{(chlorides in Product Gas + Residue)}}{\text{(total chloride in the feed gas)}}$$

The reformate solvent used to cover the solid caustic bed was a composite of products from a continuous catalytic reformer (CCR) pilot plant. The typical reforming severity was 101 RON/91.6 MON for the $C_6+$ product. The moisture content was determined to be 7 ppm, while chloride was determined using a chloride electrode to be 0.23 ppm. An analysis of the reformate, a yield summary, based on feed, is presented below.

YIELD SUMMARY (based on feed)

|  | WT % | Vol % |
|---|---|---|
| $H_2$ | 2.84 | 0.00 |
| $C_1$ | 1.26 | 3.01 |
| $C_2$ | 4.31 | 8.69 |
| $C_3$ | 6.11 | 8.65 |
| $C_4$ | 9.38 | 11.73 |
| $C_5$ | 8.70 | 9.79 |
| $C_6$ | 27.97 | 26.13 |
| $C_7$ | 22.98 | 19.06 |
| $C_8$ | 12.32 | 10.13 |
| $C_9$ | 3.35 | 2.74 |
| $C_{10}$ | 0.51 | 0.41 |
| $C_4+$ | 85.49 | 80.20 |
| $C_5+$ | 76.11 | 68.47 |
| $C_6+$ | 67.41 | 58.68 |
| Aromatics | 54.03 | 44.25 |

LUMP SUMMARY (based on feed)

|  | WT. % | Vol % |
|---|---|---|
| $N-C_5$ | 3.14 | 3.57 |
| $I-C_5$ | 4.70 | 5.39 |
| $N-C_6$ | 3.32 | 3.59 |
| $M-C_6$ | 7.39 | 8.01 |
| $D-C_6$ | 1.81 | 1.97 |
| $N-C_7$ | 0.11 | 0.11 |
| $M-C_7$ | 0.32 | 0.33 |
| $D-C_7$ | 0.18 | 0.19 |
| $N-C_8+$ | 0.00 | 0.00 |
| $I-C_8+$ | 0.01 | 0.01 |
| A-6 | 15.21 | 12.35 |
| A-7 | 22.37 | 18.43 |
| A-8 | 12.32 | 10.13 |
| A-9 | 3.34 | 2.73 |
| A-10+ | 0.79 | 0.61 |
| $N_5N_6$ | 1.07 | 1.02 |

PRODUCT DENSITIES (g/cc)

|  |  |
|---|---|
| $C_4+$ | 0.7653 |
| $C_5+$ | 0.7981 |
| $C_6+$ | 0.8248 |
| Liquid | 0.7876 |

TABLE 1

| | $N_2$, 200 cc/min, 50 psig | | | | | 5CC NaOH, 17CC Reformate Charged | | |
|---|---|---|---|---|---|---|---|---|
| Run time, min | Feed ppm/min | Feed Conc., ppm | Effluent conc., ppm | Unit1SS $N_2$/HCL % Cl removed | Residue pH | Residue Cl, ppm | Balance, % | Solvent Recovery, cc |
| 353 | 25 | 10000 | 24.92 | 99.75 | 7.05 | 6960 | 79.15 | 19 |
| 971 | 20.5 | 8200 | 17.71 | 99.78 | 7.35 | 12124 | 61.00 | 20 |
| 443 | 15 | 6000 | 41.53 | 99.31 | 7.57 | 4995 | 75.79 | 19 |
| 1002 | 13.5 | 5400 | 255.49 | 95.27 | 7.18 | 10095 | 76.52 | 20 |
| 384 | 13.5 | 5400 | 311.46 | 94.23 | 6.9 | 4066 | 84.44 | 22 |
| 1048 | 9 | 3608 | 6.11 | 99.83 | 7.51 | 6670 | 70.78 | 22 |
| | | | | | New Bed | | | |
| 4020 | 3 | 1200 | 3.68 | 99.69 | 7.88 | 6482 | 53.78 | 12 |
| 1410 | 1.7 | 680 | 2.27 | 99.67 | 7.5 | 1650 | 68.93 | 17 |
| 1335 | 1.34 | 537 | 3 | 99.44 | 7.93 | 1345 | 75.35 | 16 |
| 1120 | 1.06 | 424 | 5 | 98.82 | 8.01 | 874 | 74.04 | 16 |
| 5580 | 0.945 | 378 | 3.15 | 99.17 | 7.95 | 3852 | 73.11 | 14 |
| 1353 | 0.84 | 336 | 2.69 | 99.20 | 7.79 | 856 | 75.55 | 16 |
| 1170 | 0.775 | 310 | 4.1 | 98.68 | 8.11 | 637 | 70.70 | 16.5 |
| 1200 | 0.67 | 268 | 1.5 | 99.44 | 7.9 | 499 | 62.25 | 16 |
| 4080 | 0.58 | 232 | 2.25 | 99.03 | 8.34 | 1758 | 74.39 | 15 |
| 1110 | 0.52 | 208 | 2.7 | 98.70 | 8.08 | 393 | 68.56 | 16 |
| 1275 | 0.45 | 180 | 2.76 | 98.47 | 8.64 | 307 | 53.99 | 16 |
| 1200 | 0.395 | 158 | 3.17 | 97.99 | 8.29 | 266 | 56.79 | 16 |
| 1117 | 0.33 | 132 | 3 | 97.73 | 8.33 | 268 | 73.52 | 16 |
| 5708 | 0.29 | 116 | 4.3 | 96.29 | 8.18 | 1157 | 70.16 | 14 |
| 1212 | 0.265 | 106 | 2.01 | 98.10 | 8.45 | 232 | 72.86 | 16 |
| 1190 | 0.235 | 94 | 1.75 | 98.14 | 8.37 | 198 | 71.43 | 16 |
| 1155 | 0.21 | 84 | 2.72 | 96.76 | 8.22 | 181 | 75.75 | 15 |
| 4120 | 0.195 | 78 | 3.19 | 95.91 | 8.29 | 576 | 72.09 | 15 |
| 1195 | 0.16 | 64 | 2.39 | 96.27 | 8.3 | 117 | 62.44 | 16 |
| 1230 | 0.14 | 56 | 2.4 | 95.71 | 8.61 | 138 | 81.53 | 16 |
| 1215 | 0.13 | 52 | 1.48 | 97.15 | 8.45 | 90 | 57.92 | 16 |
| 1057 | 55 | 22000 | 5222.71 | 76.26 | 9.13 | 20393 | 44.06 | 16 |
| 420 | 51.5 | 20600 | 6118.1 | 70.30 | 8.98 | 6359 | 57.68 | 16 |
| 1193 | 48.5 | 19400 | 5958.42 | 69.29 | 9.22 | 26039 | 55.30 | 15 |
| 1220 | 47.5 | 19000 | 5930.16 | 68.79 | 9.16 | 22923 | 49.62 | 16 |
| 1167 | 45.5 | 18200 | 5957.84 | 67.26 | 9.19 | 22484 | 53.56 | 16 |
| 1200 | 45 | 18000 | 5922 | 67.10 | 9.3 | 23806 | 55.05 | 15 |

TABLE 1-continued

| | $N_2$, 200 cc/min, 50 psig | | | | | 5CC NaOH, | | |
|---|---|---|---|---|---|---|---|---|
| Run | Feed | Feed | Effluent | Unit1SS $N_2$/HCL | | 17CC Reformate Charged | | |
| time, min | ppm/ min | Conc., ppm | conc., ppm | % Cl removed | Residue pH | Residue Cl, ppm | Balance, % | Solvent Recovery, cc |
| 1322 | 40 | 16000 | 4516.79 | 71.77 | 9.52 | 26566 | 58.78 | 16 |
| | | Unit shut down and dismantled New Bed & 100 ml 10% $HC_1$ | | | | | | |
| 185 | 5.5 | 2200 | 12.32 | 99.44 | 8.01 | 785.4 | 78.40 | 16 |
| 1050 | 4.15 | 1660 | 13.1 | 99.21 | 7.93 | 3431 | 79.04 | 16 |
| 960 | 3.42 | 1368 | 5.38 | 99.61 | 7.99 | 2455 | 74.94 | 16 |

TABLE 2

| | $N_2$, 200 cc/min, 50 psig | | | | | 5CC NaOH, | | |
|---|---|---|---|---|---|---|---|---|
| Run | Feed | Feed | Effluent | Unit1SS $N_2$/HCL | | 17CC Reformate Charged | | |
| time, min | ppm/ min | Conc., ppm | conc., ppm | % $C_1$ removed | Residue pH | Residue $C_1$, ppm | Balance, % | Solvent Recovery, cc |
| 353 | 29 | 11600 | 43.06 | 99.63 | 6.98 | 6300 | 61.96 | 21 |
| 971 | 24 | 9600 | 4.53 | 99.95 | 7.41 | 13266 | 56.95 | 18 |
| 443 | 17 | 6800 | 114.67 | 98.31 | 7.6 | 4044 | 55.22 | 18 |
| 1002 | 14 | 5600 | 413.97 | 92.61 | 7.13 | 8628 | 64.46 | 19 |
| 384 | 13 | 5200 | 441.67 | 91.51 | 7.55 | 3011 | 69.16 | 23 |
| 1048 | 10 | 4000 | 385.5 | 90.36 | 7.86 | 4400 | 45.66 | 22 |
| | | | | New Bed | | | | |
| 4020 | 5 | 2000 | 6.47 | 99.68 | 7.68 | 8036 | 40.01 | 14 |
| 1410 | 2.75 | 1100 | 8.23 | 99.25 | 7.47 | 2314 | 59.89 | 23 |
| 1335 | 2.2 | 880 | 5.39 | 99.39 | 7.11 | 1788 | 61.06 | 16 |
| 1085 | 1.775 | 710 | 4.61 | 99.35 | | | | |
| 1120 | 1.59 | 636 | 5.57 | 99.12 | 7.58 | 1239 | 69.89 | 17 |
| 5580 | 1.37 | 548 | 2.9 | 99.47 | 8.23 | 4873 | 63.78 | 14 |
| 1353 | 1.185 | 474 | 3.02 | 99.36 | 8.18 | 1185 | 74.10 | 16 |
| 1170 | 1.125 | 450 | 5.23 | 98.84 | 8.06 | 875 | 66.87 | 16 |
| 1200 | 1.08 | 432 | 5.77 | 98.66 | 8.28 | 887 | 68.89 | 16 |
| 4080 | 1.025 | 410 | 6.26 | 98.47 | 8.58 | 2798 | 67.06 | 14 |
| 1110 | 0.835 | 334 | 7.71 | 97.69 | 8.08 | 476 | 52.19 | 16 |
| 1275 | 0.645 | 258 | 5.99 | 97.68 | 8.33 | 497 | 61.16 | 16 |
| 1200 | 0.54 | 216 | 6.1 | 97.18 | 8.2 | 387 | 60.66 | 17 |
| 1117 | 0.455 | 182 | 7.81 | 95.71 | 8.11 | 330 | 66.47 | 17 |
| 5708 | 0.38 | 152 | 6.6 | 95.66 | 8.22 | 1311 | 60.75 | 16 |
| 1212 | 0.305 | 122 | 4.26 | 96.51 | 8.04 | 233 | 64.18 | 16 |
| 1190 | 0.265 | 106 | 5.51 | 94.80 | 8.14 | 209 | 68.02 | 15 |
| 1155 | 0.225 | 90 | 5.06 | 94.38 | 8.1 | 156 | 61.98 | 17 |
| 4120 | 0.18 | 72 | 4.29 | 94.04 | 8.41 | 431 | 58.70 | 17 |
| 1195 | 0.145 | 58 | 3.85 | 93.36 | 8.03 | 110 | 65.70 | 17 |
| 1230 | 0.125 | 50 | 4.26 | 91.48 | 8.3 | 96.8 | 65.73 | 16 |
| 1215 | 0.11 | 44 | 3.69 | 91.61 | 8.25 | 77.1 | 60.45 | 16 |
| 1000 | 46 | 18400 | 4600 | 75.00 | 8.89 | 22632 | 59.20 | 16 |
| 460 | 48 | 19200 | 6605.2 | 65.60 | 9.21 | 9414 | 72.55 | |
| 1193 | 49 | 19600 | 6508.6 | 66.79 | 9.33 | 22635 | 49.85 | |
| 1220 | 47.5 | 19000 | 6591.2 | 65.31 | 9.18 | 22528 | 50.25 | |
| 1167 | 46 | 18400 | 6624.2 | 64.00 | 9.4 | 21905 | 53.14 | |
| 1200 | 44.5 | 17800 | 6688 | 62.43 | 9.29 | 20165 | 50.29 | |
| 1322 | 39 | 15600 | 5600.3 | 64.10 | 9.46 | 20556 | 50.73 | |
| 390 | 36.6 | 14640 | 4377.4 | 70.10 | 10.33 | 7965 | 86.47 | |
| 1050 | 33.9 | 13560 | 1955.4 | 85.58 | 9.2 | 20283 | 62.48 | |
| 390 | 30 | 12000 | 1588.7 | 86.76 | 10.46 | 7564 | 78.23 | |
| 960 | 25.65 | 10260 | 1003.3 | 90.22 | 9.16 | 14569 | 63.24 | |

DISCUSSION

I operated the process for six weeks. Although the process worked well from the start, I learned several "tricks" that made it work better, and which reduced caustic consumption and minimized waste disposal.

HIGH GAS VELOCITY—LIQUID HYDROCARBON RECYCLE

I varied the space velocity, and saw that the process would operate at very high vapor velocities through the bed, even at velocities high enough to "dry" the lower portions of the bed during upflow operation by removing all the hydrocarbon phase. This could lead to plugging, but recycling some of the liquid hydrocarbon from upper portions of the bed back to the bed inlet, or adding fresh liquid hydrocarbon, overcame this problem. This provides great freedom in reactor design. The reactor need only be designed to keep the caustic in the reactor, not the hydrocarbon phase on the caustic.

MAXIMUM CAUSTIC USAGE/CONTROL OF WATER LEVEL

Another problem was maintaining chloride removal at peak efficiency and minimizing caustic usage and disposal problems. Surprisingly, it was possible to effectively maximize both of these at the same time by controlling the amount of moisture in the gas. For the system studied, maintaining from 10 to 20 ppm by volume of water in the gas for every 4 wt ppm Cl in the in the gas gave excellent results. It is interesting to note that this level of $H_2O$ is what prevails in typical Pt reforming units. The water added was just enough to dissolve the NaCl produced in the reaction and remove it as brine.

Operating with too little water, relative to chloride could decrease bed efficiency because of a buildup of salt on the solid caustic. Operation with too much water would dissolve the caustic and produce a very alkaline disposal problem.

While a basic analytical approach can be used, adjusting water contents to match an analyzed chloride content, a simple and highly reliable control method was developed. Operate the chloride extraction reactor so that the brine phase produced had a pH below 9.0, preferably below 8.5, and most preferably about 8.0. This translates in practice into a caustic utilization efficiency of about 90% and produces an alkaline brine which can be disposed through sewage and other regular water systems.

REACTIVATION OF NaOH SURFACE

Another "trick" was how to restore operation of a salt damaged bed, or maintain the operation of a bed processing a moisture deficient gas stream. Chloride levels in gas can increase rapidly due to changes, or mistakes, in upstream processing which can lead to rapid salt build up and plugging on the solid caustic bed. Less likely, water levels in recycle gas may drop sharply. Either of this conditions can lead to a rapid buildup of salt, and a marked drop in chloride removal.

In a commercial unit, a shutdown to dump a bed of salt clogged NaOH pellets can cost many days and much money. Some refiners would require two reactors, at roughly double the capital cost, just to address the possibility of having to change out a bed of catalyst to replace salt clogged caustic.

Fortunately, I also discovered a way to remove excess salt, while normal operation continues. Simply hydrating the gas charged through the bed would add enough water to effectively wash the salt from the surface of the solid caustic. Thus when chloride removal was down to 64.1% some deactivation of the NaOH surface was observed. Traces of water were added to the system by "saturating" the nitrogen gas for 5 hours with water, i.e., the naphtha saturator or pretreater was replaced with water so that the incoming nitrogen was saturated with water. The chloride removal jumped from 64.1% to 70.1% during this period. The water was removed during the next 16 hours and the chloride removal continued to increase to 84.3%. Two days later, the nitrogen gas was again saturated for 5 hours and the chloride removal improved to 86.3%. For the next 16 hours, water addition was terminated, but chloride removal continued to improve to 88.8%.

In normal refinery practice, it should not be necessary to reactivate the solid caustic bed for reformer net gas make or recycle gas streams, which typically contain 10–20 ppm water and 3–4 ppm HCl. This ratio of H2O/HCl is just about right. For different streams, with different amounts of chloride, different amounts of water/steam injection may be needed to provide just enough water to wash the salts off as they deposit. The significance of the reactivation procedure is that refiners have some way to recover activity to meet the local needs.

1. Efficacy of the Quadriphase Process

The process is remarkably effective in removing chlorides from gas streams with solid caustic, without plugging the caustic bed. The efficacy of the process is believed due to the high rate of the neutralization reaction. The reactions are simple neutralizations with rates too fast to measure. The efficacy of the process is assured by providing intimate contact between the oil droplets and solid caustic in the bed. The solid caustic is wetted with water of neutralization and perhaps from water in the vapor, and this forms a skin of caustic solution which efficiently removes chlorides from the vapor.

2. Moisture Content of Product

The product can be very dry. It is possible to run the process so that little or no water is added to the vapor. The aqueous phase surrounding the solid caustic particles is itself coated with oil, so there is much less hydration of the gas during treating as compared to a comparable all aqueous phase treating process.

In some processes, such as catalytic reforming, addition of any significant amount of water may compound chloride problems, by washing additional catalyst from the bed, so use of an "all hydrocarbon" gas treating process which does not add much water vapor to the gas being treated can be a great advantage. My treating process is "all hydrocarbon" in that the gas phase passing through the bed only comes in contact with the hydrocarbon phase covering the brine coated caustic particles.

3. NaOH in Vapor

The NaOH (and brine) carry over in the vapor product appears to be very low. Very little if any of the constrained aqueous phase on the solid caustic migrated through the oil coating into the vapor. If entrainment of oil or brine is a problem, conventional coalescers such as mesh demisters and the like may be used to remove the mist.

4. pH of Produced Brine

The pH of the brine removed from the solid caustic bed was, surprisingly, almost neutral.

This brine can, in many jurisdictions, simply be disposed using the existing sewer system. The chloride concentration of this material is preferably relatively high to minimize the volume of brine sent to the refinery sewer system.

WATER CONTROL

Many vapors will have sufficient water present in them, or sufficient water will form due to the neutralization reaction, to permit the process to operate effectively without water addition. Some vapor streams will be too dry, or contain such large amounts of chlorides, that more water will be needed for effective operation. The same reformer can produce vapor streams with sharply varying chloride levels depending on the reformer cycle. With fresh catalyst, in the winter months when flow rates and octane requirements (and catalyst regeneration frequency) are low there will be little chloride in the vapor. Summer months, catalyst due for replacement, etc. can increase chloride contents by a factor of 5 or 10 relative to other times.

Good results can be achieved when the water content is adjusted as necessary so that the following ratios of halide to water are maintained. As most of the halide content will be chlorine, the ratios are given as H2O:Cl ratios. Good results can be achieved with ratios of 1:1 to 50:1, on a weight ppm basis. Better results are achieved when this ratio is 2:1 to 20:1, and excellent results are achieved with a ratio of about 3:1 to 10:1. Optimum results are believed to be reached with a 4.1:1 ratio.

Operation with the low amounts of water will still remove chlorides, but perhaps not remove them all. In some circumstances this may be acceptable. Operation with more water than is needed will wash away the bed of solid caustic before it is consumed catalytically, although my process is fairly tolerant of "wet" vapor streams, because the oil coating on the particles of solid caustic isolates to a great extent caustic from water or water vapor in the flowing stream to be treated.

I claim:

1. A process for removing acidic halides from a gas phase containing acidic comprising:
   a. disposing solid particles of caustic as a porous bed;
   b. dissolving at least some of said solid caustic in an aqueous layer covering said solid particles;
   c. coating or immersing said aqueous layer with an immiscible hydrocarbon liquid phase; and
   d. reactively extracting acidic halides from said gas phase by passing said gas through said porous bed.

2. The process of claim 1 wherein said bed is immersed in a hydrocarbon continuous phase which covers said bed.

3. The process of claim 1 wherein said bed is at least partially in a gas continuous phase and said solid caustic is coated with hydrocarbon by mixing some liquid hydrocarbon with said gas phase.

4. The process of claim 1 wherein said bed is coated with hydrocarbon by intermittent immersion in, or washing of, said bed with liquid hydrocarbon.

5. The process of claim 1 wherein said solid caustic comprises NaOH, KOH or mixtures thereof.

6. The process of claim 1 wherein said solid caustic is essentially pure NaOH.

7. The process of claim 1 wherein said solid caustic is contained in porous bags, perforated pipe, or screens.

8. The process of claim 1 wherein said acidic halides are chlorides.

9. A process for removing acidic halides from an acidic halide containing gas comprising:
   a. disposing particles of solid caustic as a porous bed;
   b. immersing said bed in a hydrocarbon liquid phase;
   c. forming an aqueous film on said solid caustic beneath said hydrocarbon liquid phase by passing a moisture containing gas through said bed; and
   d. reactively extracting acidic halides from said halide containing gas by passage through said porous bed.

10. The process of claim 9 wherein the halide containing gas is a reformer recycle gas or a net hydrogen rich gas stream from a reformer.

11. The process of claim 9 wherein the gas is a reformer off gas stream.

12. The process of claim 9 wherein said aqueous film on said solid caustic produces a brine phase which is at least intermittently removed from said bed, and a pH of said brine phase is measured, and said halide containing gas has a moisture level and said moisture level in said halide containing gas is controlled-to maintain the pH of said brine between 7 and 9.

13. The process of claim 9 wherein said gas has a halide level and a moisture level and wherein said halide levels and moisture levels in said gas are measured, and additional water is added to said process in an amount sufficient to provide at least 2 ppmv water vapor in said gas per ppm halide in said gas.

* * * * *